July 26, 1938.  J. M. ETHRIDGE  2,124,816
MEANS FOR DELINTING COTTONSEED
Filed July 19, 1935  4 Sheets-Sheet 2

Inventor
J. M. Ethridge
By C. A. Snow & Co.
Attorneys.

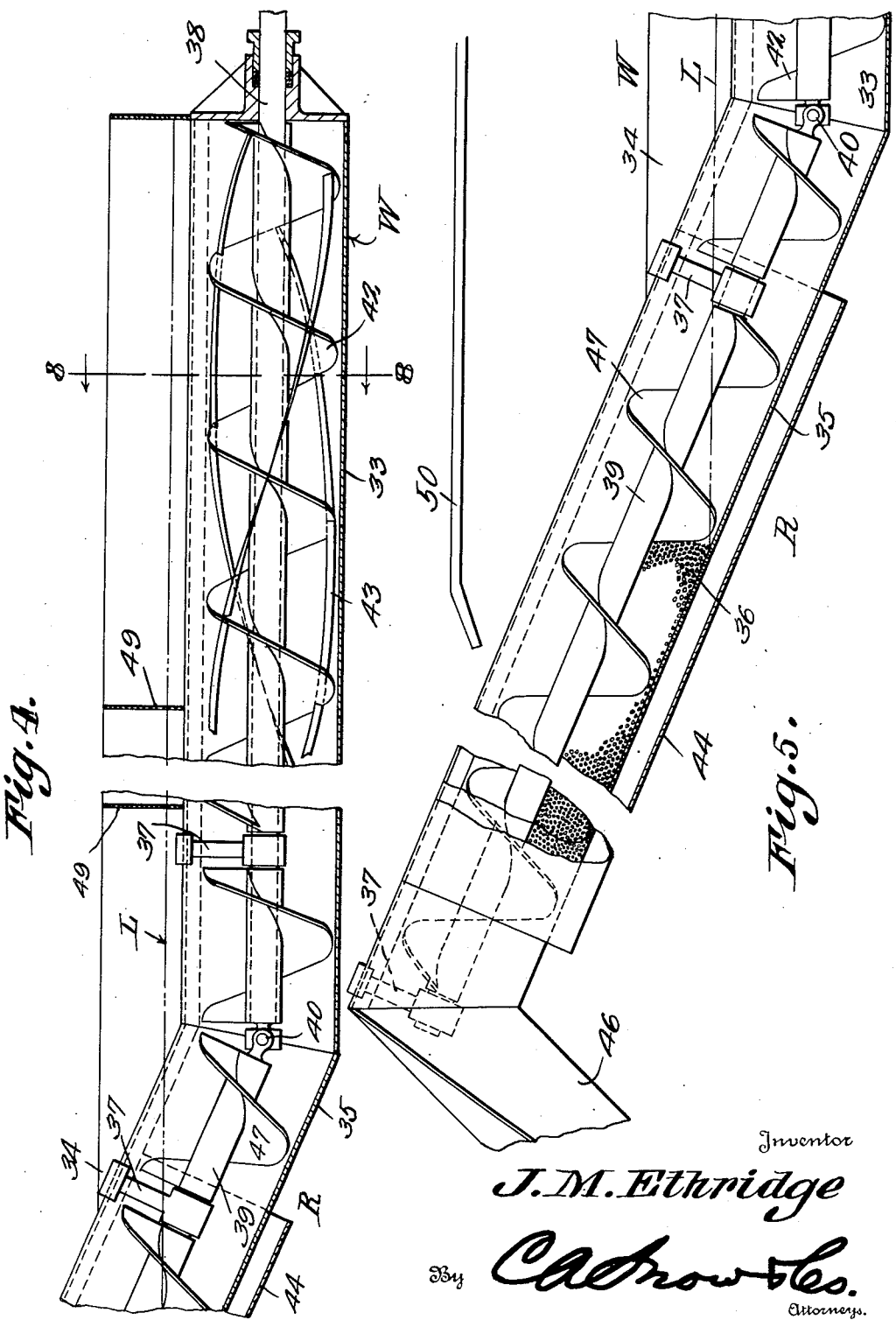
July 26, 1938.    J. M. ETHRIDGE    2,124,816
MEANS FOR DELINTING COTTONSEED
Filed July 19, 1935    4 Sheets-Sheet 4

Patented July 26, 1938

2,124,816

UNITED STATES PATENT OFFICE 2,124,816

MEANS FOR DELINTING COTTONSEED

James M. Ethridge, Mesilla Park, N. Mex.

Application July 19, 1935, Serial No. 32,296

1 Claim. (Cl. 209—173)

This invention relates to a means for delinting cotton seed, one of the objects being to provide an apparatus whereby a continuous delinting operation can be carried out, the seed being successively deposited in the apparatus, treated with acid supplied thereto in predetermined proportions, washed and dried so that the seed will be delivered in a clean and unspoiled condition ready for planting or other purposes.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

In the accompanying drawings the preferred form of the invention has been shown.

In said drawings:

Figure 1a is a front elevation of the remainder thereof.

Figure 4 is a longitudinal section through a portion of the washer and rinser.

Figure 5 is a longitudinal section through the delivery end portion thereof.

Figure 1:
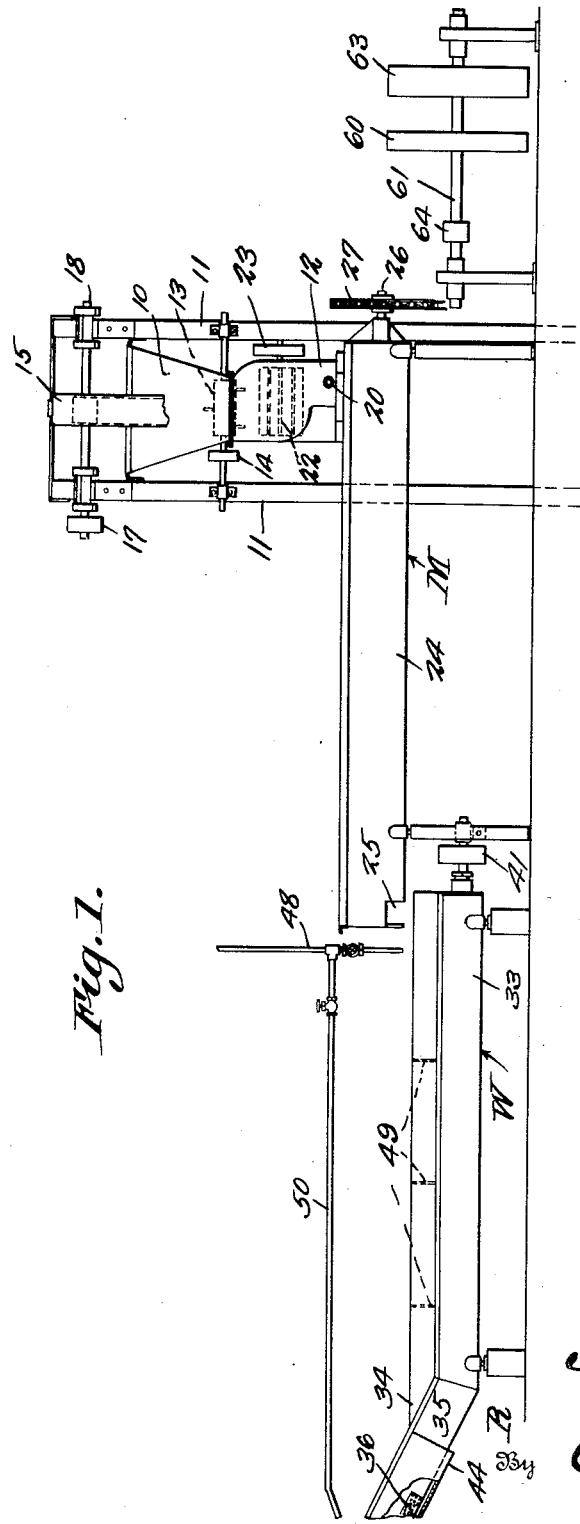
Figure 1 is a front elevation of a portion of the apparatus.

Referring to the figures by characters of reference, 1 designates a heating furnace having a hot water tank 2 in which is supported a tank 3 for holding sulphuric acid. An auxiliary tank 4 is employed for holding acid and the bottom thereof communicates with the bottom of the tank 3 through a pipe 5. A pump 6 is employed for withdrawing acid from a supply tank not shown through a pipe 7 and directing it through a pipe 8 into the top of tank 4, this latter tank having a suitably located overflow pipe 9.

It will be obvious from the foregoing that while the furnace is in operation the water in tank 2 will be kept at a high temperature and will keep the acid in tank 3 likewise at a high temperature, it being understood that the tank 3 will be kept constantly filled by the gravitation of acid thereto from the auxiliary tank 4. Furthermore the pump 6 can be operated at such a speed as to supply acid to tank 4 in sufficient quantities to take the place of the acid withdrawn from tank 3 for use in the apparatus hereinafter described.

A feed hopper 10 is supported in a suitable frame 11 and has an outlet spout 12 for delivering seed into mixer M. In the hopper 10 is a rotatable agitator 13 of any suitable construction adapted to be rotated by belt and pulley mechanism 14 receiving motion from a line shaft 15'. Thus seed directed into hopper 10 will be continuously delivered therefrom into spout 12 due to the rotation of the member 13. This seed is directed into hopper 10 by an inclined endless conveyor 15 which extends into and receives seed from a lower or main hopper 16 and carries it upwardly to a point where it will be delivered by gravity into the upper or measuring hopper 10. This conveyor is continuously actuated by any suitable mechanism. For example a belt and pulley drive indicated generally at 17 can be used for transmitting motion from shaft 15' to the top shaft 18 of the conveyor.

An outlet pipe 19 extends from the top of the hot acid tank 3 and extends to a delivery nozzle 20 opening into the outlet end of the spout 12. By means of a suitable valve 21 the discharge of hot acid from this nozzle can be regulated so that the acid will be in proper proportion to the volume of seed being delivered to the mixer M. Thus seed to which the acid is delivered is discharged in controllable quantities by a rotatable measuring element 22 of any suitable construction which can be driven from the line shaft 15' by a belt and pulley mechanism indicated generally at 23.

Mixer M forming a part of this apparatus includes an elongated trough 24 open along its top and having one end positioned under the outlet end of the spout 20 so as to receive the mixture of acid and seed from the spout. Both ends of the trough are closed but a bottom outlet 25 is provided in the trough adjacent to that end thereof remote from the spout and through this outlet the mixture of seed and acid is adapted to be discharged into one end of a washer W.

Extending longitudinally within trough 24 is a shaft 28 on which are paddle blades 32 designed to forcibly move material toward the outlet 25.

The washer W includes an elongated trough 33 open at the top, the upper portions of its side walls being flared upwardly as shown at 34 in Figure 8. One end of the trough is closed and is supported beneath one end portion of the mixer M so that material delivered through the outlet 24 can gravitate into the washer through the open top thereof.

That end of the trough 33 remote from the mixer is inclined upwardly as indicated at 35 thus to form the rinser portion R of the apparatus. The flared walls 34 are extended straight across the sides of this rinser portion and terminate thereat, it being noted that the inclined trough 35 of the rinser is formed with numerous perforations 36 above the level of the trough 33 so that liquid contained in said trough 33 will be maintained at the level L and drain outwardly through the apertures 36.

Hangers 37 are supported in the troughs 33 and 35 and journaled within them are shafts 38 and 39 joined by a universal coupling 40 at the angle where the two troughs merge. Shaft 38 extends from the inlet end portion of trough 33 and is driven by belt and pulley mechanism 41 or the like, receiving motion from the line shaft 15'. On that portion of this shaft 38 within trough 33 is a feed worm or screw 42 so pitched that the material contained within the trough will be advanced at a desired speed along trough 33 and into the lower end of trough 35. For the purpose of lifting this material and thoroughly agitating it, the peripheral portions of the convolutions of the worm or screw are connected by spiral strips 43 extending lengthwise of the trough at a slight pitch sufficient to elevate a solid material. These strips tend to hold back the material being treated but this retarding action is more than overcome by the advancing action set up by the worm or screw 42. In other words the material while positively engaged solely by the worm or screw 42 will be advanced at one speed but that portion of the material when engaged by the spiral strips 43 will be lifted up and moved backwardly at a lesser speed. Thus the material under treatment will be thoroughly agitated by being elevated and dropped and moved backwardly and forwardly as it advances toward the trough 35.

The upper end of the trough 35 forming the body portion of the rinser R has its foraminous portion 36 extended within a collecting trough 44 which is open at its upper and lower ends. Thus liquid and small solids delivered through the apertures 36 will be gathered by the collecting trough and delivered downwardly into any suitable container provided therefor.

The upper end of the trough 35 opens into a delivery spout 46 and the inclined shaft 39 supported for rotation in this trough 33 carries a worm conveyor 47. Consequently material delivered to the lower end of trough 35 will be carried upwardly thereby, the liquid at and adjacent to the level L draining promptly through the adjacent openings 36 while other liquid carried upwardly momentarily by the treated seeds will drain at higher levels through openings 36.

While passing through the washer W the lint separated from the seed by the acid will be divided from said seed by flotation and the acid will be diluted by water discharged into the washer through a pipe 48. Transverse baffles 49 are arranged between the flared sides 34 of the mixer for the purpose of retarding the flow of the solids which have risen to the surface of the liquid and these solids can be removed from time to time from between the baffles by any suitable means. These baffles extend to a level slightly below the level of the liquid in the washer W and form non-communicating air spaces or compartments above the liquid level. Only the liquid and any slight particles which may have escaped under the baffles will be able to reach the openings 36.

As a result of the thorough agitation and retarded advance of the seed in the washer W the acid as well as the lint will be thoroughly removed from the seed and said seed left uninjured and clean upon reaching the delivery end of the rinser R. As a further means for insuring thorough washing of the seed a water pipe 50 can be extended to the upper portion of the rinser for delivery onto the material being carried upwardly therein.

The delivery spout 46 opens downwardly into one end of a rotary drier indicated at D. This drier comprises a skeleton frame carried by a shaft 52. At one end of this frame there is a large pulley or sprocket 53 in the form of a ring and this is adapted to receive motion from a chain or belt 54 from a sprocket or pulley 55 on the line shaft 15'. The frame has a covering 56 of foraminous material such as a heavy wire screen.

During the agitation and advance of the material within the drier, the said material is subjected to the action of a blast of hot air which is directed into the inlet end thereof from a flue 58 which receives suitably heated air from a blower 59.

Figures 2, 6:
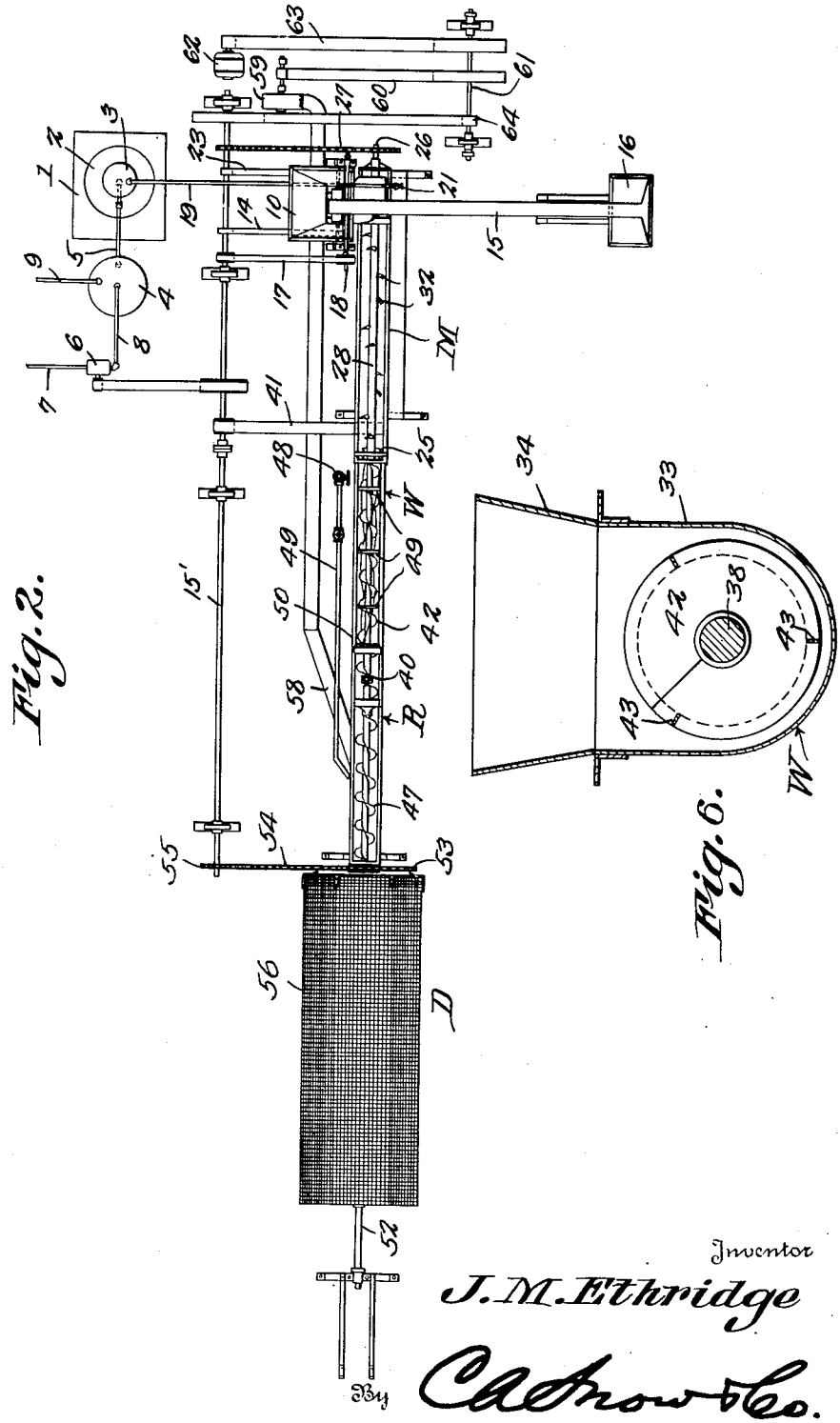
Figure 2 is a plan view of the complete apparatus.
Figure 6 is a section on line 6—6, Figure 4.
Figure 3:
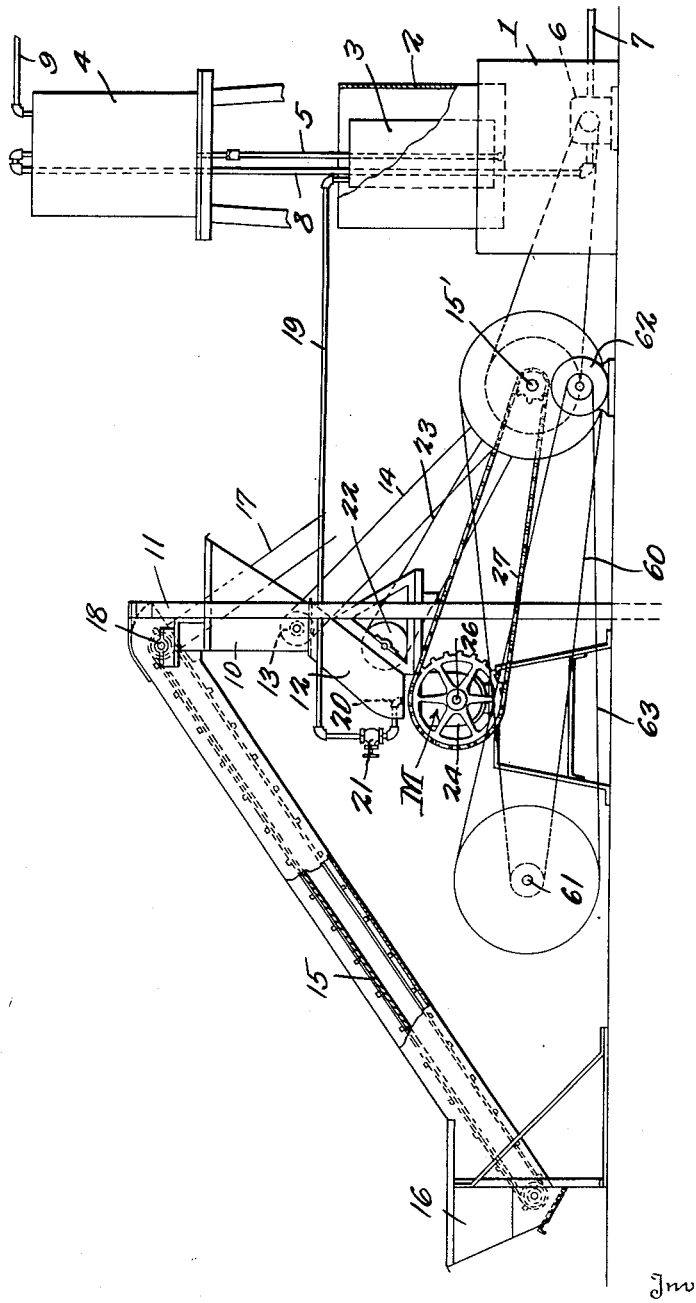
Figure 3 is an end elevation thereof.

As shown particularly in Figure 2 the blower 59 receives motion through belt and pulley mechanism 60 or the like from a countershaft 61 which in turn is driven by a motor 62 through belt and pulley mechanism 63 or the like. Belt and pulley mechanism 64 or the like serves to transmit motion from countershaft 61 to the line shaft 15'.

It is to be understood that all of the parts of this mechanism are so timed that seed will travel continuously from hopper 16 to the outlet of the drier without requiring attention and during this movement the seed will be measured so as to be admitted to the mixer in proper portion to the acid which is also admitted thereto; the seed and acid will be thoroughly agitated and mixed to insure separation of the lint from the seed; the mixture of seed and acid will be delivered into the washer where the acid will be diluted and carried off and the lint divided by flotation from the seed; the cleaned seed will be given a supplemental washing and drained; and finally the seed will be directed into the drier where the added moisture will be removed therefrom and the seed delivered in marketable condition.

It will be noted that bulk feeding of seed is eliminated by the constant supplying of measured proportions. As the operation is continuous, the apparatus requires no attention after the proper adjustments as to proportions and speeds have been made.

What is claimed is:

In apparatus for use in the treatment of seed, a washer for receiving a mixture of seed and acid, said washer including a trough open at the top, a washing fluid trapped in the trough, baffles extending transversely of the open top of the trough and downwardly to a level below but close to the level of the liquid in the trough, thereby to divide into non-communicating air spaces the area in the trough above the liquid, the liquid in the trough constituting means for separating material by flotation from the seed and positioning it between the baffles and also means for diluting the acid, means rotatable about an axis extending longitudinally of the washer and below the baffles for lifting and dropping the seed within the washing fluid and for advancing and retracting the seed relative to one end of the washer, the advance movement of the seed being greater than the movement of the seed in the opposite direction, whereby the seed is fed toward one end of the washer but retarded during such movement, said means comprising a worm having continuous convolutions and spiral strips connecting the marginal portion of the convolutions substantially at right angles thereto, and means at that end of the washer toward which the seed is advanced, for removing the seed from the washing fluid.

JAMES M. ETHRIDGE.